United States Patent Office 3,529,059
Patented Sept. 15, 1970

3,529,059
CERTAIN 2-BENZOXAZOLINONE AND 2-BENZO-
THIAZOLINONE DERIVATIVES OF O,O-DIAL-
KYL S-[2-HALOETHYL] PHOSPHOROTHIOATES
AND DITHIOATES FOR KILLING SOUTHERN
ARMY WORM LARVAE
Joel D. Jamison, New Castle County, Del., assignor to
Hercules Incorporated, Wilmington, Del., a corpora-
tion of Delaware
No Drawing. Continuation-in-part of application Ser. No.
601,553, Dec. 14, 1966, which is a continuation-in-part
of application Ser. No. 535,735, Mar. 21, 1966, which
in turn is a continuation-in-part of application Ser. No.
417,516, Dec. 10, 1964. This application Feb. 24, 1969,
Ser. No. 801,767
Int. Cl. A01n 9/36
U.S. Cl. 424—200                                 7 Claims

ABSTRACT OF THE DISCLOSURE

Disclosed are compounds of the formula:

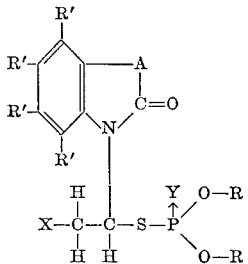

wherein each R is a lower alkyl radical, Y is selected from
the group consisting of the oxo and thioxo radicals, X is
a halo radical, A is selected from the group consisting of
the oxy and thio radicals, and each R' is selected from the
group consisting of the hydrogen and halo radicals. These
compounds are highly toxic to southern army worm larvae.

---

The application is a continuation-in-part of the applica-
tion, Ser. No. 601,553, filed Dec. 14, 1966 now abandoned,
which is a continuation-in-part of the application, Ser. No.
535,735, filed Mar. 21, 1966, on which Pat. 3,355,353 was
granted and which in turn is a continuation-in-part of the
now abandoned application, Ser. No. 417,516, filed
Dec. 10, 1964.

This invention is in the chemical arts. It relates to that
part of organic chemistry having to do with organo sulfur-
phosphorous compounds, and to insecticidal compositions
containing organo sulfur-phosphorous compounds.

This invention comprises certain novel phosphorothio-
ates and phosphorodithioates, and novel insecticidal com-
positions containing them.

The phosphorothioates and phosphorodithioates of this
invention are represented by the general structural For-
mula I:

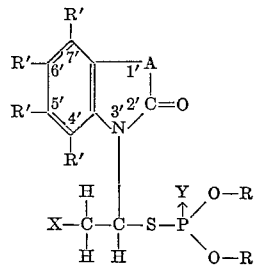

wherein each R is a lower alkyl radical, Y is selected from
the group consisting of the oxo and thioxo radicals, X is
a halo radical, A is selected from the group consisting of
the oxy and thio radicals, and each R' is selected from the
group consisting of the hydrogen and halo radicals. The
R radicals can be the same or different. A lower alkyl
radical is an alkyl radical having 1–7 carbon atoms, and
can be either straight or branched. Examples of a lower
alkyl radical include the methyl, ethyl, propyl, isopropyl,
butyl, isobutyl, t-butyl, etc. radicals. The halo radicals in
those compounds having more than one halo radical can
be the same or different. Examples of the halo radical are
the fluoro, chloro, bromo and iodo radicals. Examples of
the compounds of this invention include:

O,O-dimethyl S-[2-chloro-1-(2'-benzoxazolinone-3'-yl)-
  ethyl]phosphorodithioate
O,O-dimethyl S-[2-bromo-1-(2'-benzoxazolinone-3'-yl)-
  ethyl]phosphorodithioate
O,O-dimethyl S-[2-fluoro-1-(2'-benzoxazolinone-3'-yl)-
  ethyl]phosphorodithioate
O,O-dimethyl S-[2-iodo-1-(2'-benzoxazolinone-3'-yl)-
  ethyl]phosphorodithioate
O,O-diethyl S-[2-chloro-1-(2'-benzoxazolinone-3'-yl)-
  ethyl]phosphorodithioate
O,O-diethyl S-[2-bromo-1-(2'-benzoxazolinone-3'-yl)-
  ethyl]phosphorodithioate
O-methyl-O-ethyl S-[2-chloro-1-(2'-benzoxazolinone-
  3'-yl)ethyl]phosphorodithioate
O,O-dipropyl S-[2-chloro-1-(2'-benzoxazolinone-3'-yl)-
  ethyl]phosphorodithioate
O,O-diisopropyl S-[2-chloro-1-(2'-benzoxazolinone-3'-
  yl)ethyl]phosphorodithioate
O,O-diheptyl S-[2-chloro-1-(2'-benzoxazolinone-3'-yl)-
  ethyl]phosphorodithioate
O,O-diethyl S-[2-chloro-1-(6'-chloro-2'-benzoxazolinone-
  3'-yl)ethyl]phosphorodithioate
O-ethyl-O-isopropyl S-[2-fluoro-1-(6'-chloro-2'-benz-
  oxazolinone-3'-yl)ethyl]phosphorodithioate
O,O-diethyl S-[2-chloro-1-(5',6'-dichloro-2'-benzoxa-
  zolinone-3'-yl)ethyl]phosphorodithioate
O,O-diethyl S-[2-iodo-1-(5',6'-dichloro-2'-benzoxa-
  zolinone-3'-yl)ethyl]phosphorodithioate
O,O-diethyl S-[2-chloro-1-(2'-benzoxazolinone-3'-yl)-
  ethyl]phosphorodithioate
O,O-diethyl S-[2-chloro-1-(6'-chloro-2'-benzoxa-
  zolinone-3'-yl)ethyl]phosphorodithioate
O,O-diethyl S-[2-fluoro-1-(6'-chloro-2'-benzoxazolinone-
  3'-yl)ethyl]phosphorodthioate
O,O-dimethyl S-[2-bromo-1-(2'-benzothiazolinone-3'-yl)-
  ethyl]phosphorodithioate
O,O-dimethyl S-[2-chloro-1-(2'-benzothiazolinone-3'-yl)-
  ethyl]phosphorodithioate
O,O-dimethyl S-[2-iodo-1-(2'-benzothiazolinone-3'-yl)-
  ethyl]phosphorodithioate
O,O-dimethyl S-[2-fluoro-1-(2'-benzothiazolinone-3'-yl)-
  ethyl]phosphorodithioate
O,O-diethyl S-[2-bromo-1-(2'-benzothiazolinone-3'-yl)-
  ethyl]phosphorodithioate
O,O-diethyl S-[2-chloro-1-(2'-benzothiazolinone-3'-yl)-
  ethyl]phosphorodithioate
O-methyl-O-ethyl S-[2-bromo-1-(2'-benzothiazolinone-3'-
  yl)ethyl]phosphorodithioate
O,O-dibutyl S-[2-bromo-1-(2'-benzothiazolinone-3'-yl)-
  ethyl]phosphorodithioate
O,O-diisobutyl S-[2-bromo-1-(2'-benzothiazolinone-3'-
  yl]ethylphosphorodithioate
O,O-di-t-butyl S-[2-bromo-1-(2'-benzothiazolinone-3'-
  yl)ethyl]phosphorodithioate
O,O-dihexyl S-[2-bromo-1-(2'-benzothiazolinone-3'-yl)-
  ethyl]phosphorodithioate
O,O-diethyl S-[2-iodo-1-(6'-chloro-2'-benzothiazolinone-
  3'-yl)ethyl]phosphorodithioate O,O-diethyl S-[2-chloro-1-(2'-benzothiazolinone-3'-yl)-
ethyl]phosphorodithioate O-methyl-O-propyl S-[2-fluoro-1-(4'-bromo-2'-benzo-
thiazolinone-3'-yl)ethyl]phosphorodithioate In general the compounds of this invention at 20–25° C. are oils that are highly insoluble in water, but soluble in solvents such as acetone and the like, and benzene and the like. In general they are biologically active, being toxic to a number of insects such as, for example, Mexican bean beetle, pea aphid, mosquito larvae and particularly southern army worm larvae. Consequently, the compounds of this invention are useful as insecticides and especially as southern army worm toxicants.

Each compound of this invention is made by reacting a compound of the general structural Formula II:

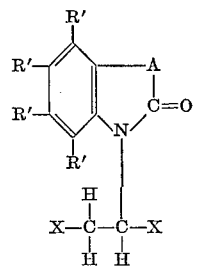

wherein in each X and each R' are as defined in the case of structural Formula I, with a compound of the general structural Formula III:

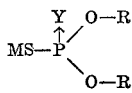

wherein each R and Y are as defined in Formula I, and M is a cationic radical, examples of which include the ionic hydrogen, ammonium, amino, pyridinium, alkali metal (sodium, potassium and the like), and the like radicals. When M is the ionic hydrogen radical, reaction is preferably effected with the aid of a metal, such as, for example, finely divided zinc or the like, a metallic salt, such as, for example, zinc chloride or the like. Preferably the reaction is carried out at atmospheric pressure and 20–100° C. in a normally liquid reaction medium in which the organic reactant is soluble. Examples of a normally liquid reaction medium include acetonitrile, normal liquid ketones (acetone, methyl ethyl ketone), water, dimethylformamide, dimethyl sulfoxide and ethyl acetate. When the pyridinium or trialkyl ammonium salts are used, aromatic solvents such as benzene and toluene, are preferred.

For use as insecticides and particularly as southern army worm toxicants, the compounds of this invention are preferably embodied into dispersible compositions. Such a composition generally comprises a dispersible carrier. Specific embodiments of these dispersible compositions include dispersible solid compositions and dispersible liquid compositions.

In the case of a dispersible solid composition, the carrier generally is a dispersible inert solid, examples of which are well known in the insecticide art. A typical dispersible solid of this type is clay. Other suitable solid dispersible solids include talc, attapulgite, pyrophylite, diatomaceous earth, kaolin, aluminum and magnesium silicate, montmorillonite, fuller's earth, corn cobs, saw dust, and the like. The solid dispersible composition can be air dispersible, in which case it can be applied as a dust. It can be water dispersible, and generally when it is intended that the composition be water dispersible, the composition preferably contains emulsifying material (one or more surfactants) at a concentration sufficient to enable a suspension of the desired degree of stability to be formed when the composition is admixed with a suitable quantity of water. A typical dispersible solid composition of this invention generally comprises 10–50% by weight of active or toxicant material. The toxicant material comprises at least one compound of this invention. In some embodiments it comprises more than one compound of this invention. In other specific embodiments it comprises not only one or more compounds of this invention, but other toxicants such as for example, toxaphene, parathion, methyl parathion, and the like.

A dispersible liquid composition generally comprises dispersed in water a solution of toxicant or active material in an inert, volatile, water immiscible solvent for the toxicant material. The solution or concentrate typically comprises 10–50% by weight of toxicant material and 50–90% by weight of solvent. Preferably the composition also comprises emulsifying material at a concentration sufficient to enable a dispersion of the desired degree of stability to be formed. A typical emulsifying material concentration is 1–10% by weight of the concentrate. The water concentration is such that the toxicant material concentration is about 0.5–10% by weight of the total composition.

Examples of the surfactants employed in both the liquid and solid dispersible compositions of this invention comprise the well-known surface active agents of the anionic, cationic or non-ionic types and include alkali metal (sodium or potassium) oleates and similar soaps, amine salts of long chain fatty acids (oleates), sulfonated animal and vegetable oils (fish oils and castor oil), sulfonated petroleum oils, sulfonated acyclic hydrocarbons, sodium salts of lignin sulfonic acids, alkylnaphthalene sodium sulfonates, sodium lauryl sulfonate, disodium monolauryl-phosphates, sorbitol laurate, pentaerythritol monostearate, glycerol monostearate, polyethylene oxides, ethylene oxide condensates of stearic acid, stearyl alcohol, stearyl amine, rosin amines, dehydroabietyl amine and the like, lauryl amine salts, dehydroabietyl amine salts, lauryl pyridinium bromide, stearyl trimethylammonium bromide, and cetyl dimethylbenzylammonium chloride.

The dispersible compositions of this invention are made by conventional ways and means well known in the art.

The dispersible compositions of this invention are used by applying them by conventional ways and means to the habitat of the insects to be killed or to the plants to be protected. Generally, they are applied at rates of ¼–10 pounds of active or toxic material per acre. Higher and lower effective rates, however, are within the broader concepts of this invention.

The best mode now contemplated for carrying out this invention is illustrated by the following working examples of various aspects of the invention, including specific embodiments. This invention is not limited to these specific embodiments. In these examples, all percentages are by weight unless otherwise indicated, all parts by weight are indicated by "w," all parts by volume are indicated by "v," and each part by weight (w) bears the same relationship to each part by volume (v) as the kilogram does to the liter.

EXAMPLE 1

This example demonstrates the preparation of O,O-dimethyl S - [2-chloro-1-(2'-benzoxazolinone-3'-yl)ethyl] phosphorodithioate.

A mixture of 7.0w of 3-(1,2-dichloroethyl)-2-benzoxazolinone and 5.3w of ammonium O,O-dimethyl phosphorodithioate in 50v of acetonitrile is allowed to stand at 20–25° C. for 18 hours and then at 50° C. for 2 hours. The reaction mixture thus formed is filtered, concentrated diluted with benzene and the benzene solution washed with 5% sodium bicarbonate and water. After drying the benzene solution over magnesium sulfate, the benzene is removed to give an oil. A typical yield of the oil is 7.4w. This oil consists essentially of O,O-dimethyl S-[2-chloro-1-(2'-benzoxazolinone-3'-yl)ethyl] phosphorodithioate. A typical analysis of the oil gives 8.8% phosphorous. The calculated phosphorous content of the compound is 8.9%.

EXAMPLE 2

This example illustrates how to make O,O-dimethyl S-[2-bromo-1-(2′-benzoxazolinone-3′-yl)ethyl] phosphorodithioate.

A mixture of 16.1w of 3-(1,2-dibromoethyl)-2-benzoxazolinone and 9.6w of ammonium O,O-dimethyl phosphorodithioate in 100v of acetonitrile is stirred at about 25° C. for 18 hours and then at 60° C. for 4 hours. The mixture is cooled, poured into 1000v of water, and extracted with benzene. The benzene solution is washed first with 5% aqueous sodium bicarbonate and then with water, and dried. The benzene is removed to give the desired product. It typically is an oil consisting essentially of O,O-dimethyl S-[2-chloro-1-(2′-benzoxazolinone-3′-yl)ethyl] phosphorodithioate. A typical yield of the product is 14.7w. A typical analysis of the product indicates 7.8% phosphorous. The calculated phosphorous content of the compound is 7.9%.

EXAMPLE 3

In this example O,O-diethyl S-[2-chloro-1-(2′-benzoxazolinone-3′-yl)ethyl] phosphorodithioate is made.

Following the procedure of Example 2, 108.2w of 3-(1,2-dichloroethyl)-2-benzoxazolinone and 110.0w of ammonium O,O-diethyl phosphorodithioate are reacted in 500v of acetonitrile and a product is isolated. A typical yield is 179.6w. It typically is a solid consisting essentially of O,O-diethyl S-[2-bromo-1-(2′-benzoxazolinone-3′-yl)ethyl] phosphorodithioate. A typical phosphorous content of the product is 8.5%. The calculated phosphorous content of the compound is 8.1%.

EXAMPLE 4

This example shows how to make O,O-diethyl S-[2-2-bromo-1-(2′-benzoxazolinone - 3′ - yl)ethyl] phosphorodithioate.

By the procedure of Example 2, 16.1w of 3-(1,2-dibromoethyl - 2 - benzoxazolinone, and 11.2w of ammonium O,O-diethyl phosphorodithioate are reacted in 100v of acetonitrile and a product is separated from the reaction mixture. It typically is an oil (20.4w) which consists essentially of O,O-diethyl S-[2-bromo-1-(2′-benzoxazolinone-3′-yl)ethyl] phosphorodithioate. The product typically analyzes 7.8% phosphorous. The calculated phosphorous content of the compound is 7.3%.

EXAMPLE 5

This example relates to O,O-diethyl S-[2-chloro-1-(6′-chloro-2′-benzoxazolinone-3′ - yl) - ethyl] phosphorodithioate and its production.

By the procedure of Example 2, 13.4w of 6-chloro-3-(1,2-dichloroethyl) - 2 - benzoxazolinone and 12.0w of ammonium O,O-diethyl phosphorodithioate are reacted in 100v of acetonitrile and the desired product isolated. It typically is an oil (18.1w) which consists essentially of O,O-diethyl S-[2-chloro-1-(6′-chloro-2′-benzoxazolinone-3′-yl)ethyl] phosphorodithioate. A typical analysis of the product indicates 7.5% phosphorous (the calculated value for phosphorous in the compound is 7.4%.

EXAMPLE 6

This example demonstrates how to make O,O-diethyl S-[2-chloro-1-(5′,6′-dichloro - 2′ - benzoxazolinone-3′-yl)ethyl] phosphorodithioate.

By the procedure of Example 2, 11.0w of 3-(1,2-dichloroethyl)-5,6-dichloro - 2 - benzoxazolinone and 8.3w of ammonium O,O-diethyl phosphorodithioate are reacted in 100v acetonitrile, and the desired product is isolated. The product typically is an oil. It consists essentially of O,O-diethyl S-[2-chloro-1-(5′,6′-dichloro - 2′ - benzoxazolinone-3′-yl)ethyl] phosphorodithioate. Typically it analyzes 5.3% phosphorous (the calculated phosphorous content of the compound is 6.8%).

EXAMPLE 7

This example illustrates the making of O,O-diethyl S-[2 - chloro-1-(2′-benzoxazolinone - 3′ - yl)ethyl] phosphorothioate.

Following the procedure of Example 2, 11.6w of 3-(1,2-dichloroethyl) - 2 - benzoxazolinone and 10.3w of ammonium O,O-diethyl phosphorothioate are reacted in 100v of acetonitrile and a product consisting essentially of O,O-diethyl S-[2-chloro-1-(2′ - benzoxazolinone-3′-yl)ethyl] phosphorothioate is isolated. The product typically is an oil (16.9w) and analyzes 8.6% phosphorous (the calculated value for phosphorous in the compound is 8.5%).

EXAMPLE 8

In this example O,O-diethyl S-[2-chloro-1-(6′-chloro-2′-benzoxazolinone - 3′ - yl)ethyl] phosphorothioate is made.

Using the procedure of Example 2, 9,3w of 6-chloro-3-(1,2-dichloroethyl)-2-benzoxazolinone and 7.5w of ammonium O,O-diethyl phosphorothioate are reacted in 100v of acetonitrile and the desired product is isolated. It typically is an oil (12.4w) which consists essentially of O,O-diethyl S-[2-chloro-1-(6′ - chloro - 2′ - benzoxazolinone-3′-yl)ethyl] phosphorothioate, and analyzes 7.7% phosphorous (the calculated phosphorous content of the compound is 7.8%).

EXAMPLE 9

Here, O,O-dimethyl S-[2-bromo - 1 - (2′ - benzothiazolinone-3′-yl)ethyl] phosphorodithioate is made.

A mixture of 12.0w of 3-(1,2-dibromoethyl)-2-benzothiazolinone and 6.8w of ammonium O,O-dimethyl phosphorodithioate in 100v of acetonitrile is stirred 18 hours at 25° and 4 hours at 60°. The mixture is poured into water, the resulting oil taken into benzene, the benzene solution washed first with 5% aqueous sodium bicarbonate and then with water, and dried over anhydrous magnesium sulfate. The benzene is removed to give a product consisting essentially of O,O-dimethyl S-[2-bromo-1-(2′-benzothiazolinone-3′-yl)ethyl] phosphoordithioate. The product typically is an oil (12.6w) analyzing 7.1% phosphorous (the calculated phosphorous content of the compound is 7.7%).

EXAMPLE 10

In this example O,O-dimethyl S-[2-chloro-1-(2′-benzothiazolinone-3′-yl)ethyl] phosphorodithioate is produced.

By the procedure of Example 9, 14.9w of 3-(1,2-dichloroethyl) - 2 - benzothiazolinone and 11.6w of ammonium O,O-dimethyl phosphorodithioate are reacted in 100v of acetonitrile and the desired product consisting essentially of O,O-dimethyl S-[2-chloro - 1 - (2′ - benzothiazolinone-3′-yl)ethyl] phosphorodithioate is isolated. This product is typically an oil (18.0w), which analyzes 7.9% phosphorous and 9.8% chlorine. The calculated phosphorous and chlorine values for the compound are 8.6% and 9.7%, respectively.

EXAMPLE 11

O,O - diethyl S-[2-bromo-1-(2′-benzothiazolinone - 3′-yl)ethyl] phosphorodithioate is the compound made in this example.

The procedure of Example 9 is followed to react in acetonitrile (100v) 3-(1,2-dibromoethyl) - 2 - benzothiazolinone (12.0w) and ammonium O,O-diethyl phosphorodithioate (8.0w), and to isolate a product consisting essentially of O,O-diethyl S-[2-bromo - 1 - (2′ - benzothiazolinone-3′-yl)ethyl] phosphorodithioate. The product (15.4w) is typically an oil, which analyzes 7.3% phosphorous (the theoretical phosphorous value for the compound is 7.2%).

EXAMPLE 12

This example shows how to make O,O-diethyl S-[2-chloro - 1 - (2′ - benzothiazolinone-3′-yl)ethyl] phosphorodithioate.

The procedure of Example 9 is followed to react 14.9w of 3-(1,2 - dichloroethyl) - 2 - benzothiazolinone and 13.4w of ammonium O,O-diethyl phosphorodithioate in 100v of acetonitrile, and to isolate a product consisting essentially of O,O-diethyl S-[2-chloro-1-(2' - benzothiazolinone-3'-yl)ethyl] phosphorodithioate. The product typically is an oil (21.3w) analyzing 7.4% phosphorous (the theoretical phosphorous content of the compound is 7.6%).

EXAMPLE 13

Illustrated in this example is the production of O,O-diethyl S - [2 - chloro - 1 - (2' - benzothiazolinone - 3'-yl)ethyl]phosphorothioate.

By the procedure of Example 9, 14.9w of 3-(1,2-dichloroethyl)-2-benzothiazolinone and 12.4w of ammonium O,O-diethyl phosphorothioate are reacted in 100v of acetonitrile and the desired product is isolated. It typically is an oil (18.6w) consisting essentially of O,O-diethyl S - [2 - chloro - 1 - (2' - benzothiazolinone - 3 - yl)-ethyl] phosphorothioate and analyzes 8.3% phosphorous (the theoretical value for phosphorous in the compound is 7.9%).

Typical results obtained in employing the compounds of this invention as southern army worm toxicants are illustrated by the following actual test data which include test data obtained on known comparable compounds.

The test procedure employed to obtain these data is as follows.

An emulsifiable concentrate is made by dissolving in toluene (3 parts by weight) a sample (3 parts by weight) of the material to be tested, and adding 3 parts by weight of polyoxyethylene (20) sorbitan monolaurate (an emulsifier in which the oxyethylene content is about 20 mol percent). The concentrate is then admixed with sufficient water to form an aqueous dispersion containing the test material at a designated concentration based on the weight of the dispersion.

Using standard spraying equipment under standard conditions, the aqueous dispersion is sprayed on fresh lima bean leaves (Woods Prolyphic) about 3 inches long, each held by its stem in a vial containing water. Each leaf is sprayed on the upper surface for ten seconds and then allowed to dry. Each leaf is then placed in a small plastic box (43 cubic inches volume) with 10 third and fourth instar southern army worm larvae (*Prodenia eridania*), and the box is stored for 48 hours at 78–80° F. The larvae are then inspected and the percentage of dead or moribund larvae determined.

The test data obtained by the foregoing procedure are summarized in the following table. The samples tested consisted essentially of the indicated compounds at substantially the same degree of purity (80–99%).

| Sample | Compound | Percent kill at 0.1 wt. percent conc. | Percent kill at 0.05 wt. percent conc. | Percent kill at 0.025 wt. percent conc. |
|---|---|---|---|---|
| 1 | O,O-dimethyl S-[2-chloro-1-(2'-benzoxazolinone-3'-yl)ethyl]phosphorodithioate. | 80 | 50 | |
| 2 | O,O-dimethyl S-[2-bromo-1-(2'-benzoxazolinone-3-'yl)-ethyl]phosphorodithioate. | 100 | 70 | 30 |
| 3 | O,O-diethyl S-[2-chloro-1-(2'-benzoxazolinone-3'-yl)-ethyl]phosphordithioate. | 100 | 100 | 95 |
| 4 | O,O-diethyl S-[2-bromo-1-(2'-benzoxazolinone-3'-yl)-ethyl]phosphorodithioate. | 100 | 100 | 90 |
| 5 | O,O-diethyl S-(2-benzoxazolinone-3-yl) methyl phosphorodithioate. | 30 | 10 | |
| 6 | O,O-diethyl S-[2-chloro-1-(6'-chloro-2'-benzoxazolinone-3'-yl)ethyl]phosphorodithioate. | 100 | 100 | 80 |
| 7 | O,O-diethyl S-[2-chloro-1-(5'-6'-dichloro-2'-benzoxazolinone-3'-yl)ethyl]phosphorodithioate. | 100 | 100 | 70 |
| 8 | O,O-diethyl S-(6-chloro-2-benzoxazolinone-3-yl)-methyl phosphorodithioate. | | 45 | 10 |
| 9 | O,O-diethyl S-[2-chloro-1-(2'-benzoxazolinone-3'-yl)-ethyl]phosphorothioate. | 100 | 90 | 70 |
| 10 | O,O-diethyl S-[2-chloro-1-(6'-chloro-2'-benzoxazolinone-3'-yl)ethyl]phosphorothioate. | 100 | 100 | 80 |
| 11 | O,O-dimethyl S-[2-bromo-1-(2'-benzothiazolinone-3'-yl)-ethyl]phosphorodithioate. | 100 | 30 | 30 |
| 12 | O,O-dimethyl S-[2-chloro-1-(2-chloro-1-(2'benzothiazolinone-3'-yl)ethyl]phosphorodithioate. | | 70 | 20 |
| 13 | O,O-dimethyl S-(2-benzothiazolinone-3-yl)methyl phosphorodithioate. | 100 | 0 | 0 |
| 14 | O,O-diethyl S-[2-bromo-1-(2'-benzothiazolinone-3'-yl)ethyl]phosphorodithioate. | 100 | 90 | 80 |
| 15 | O,O-diethyl S-[2-chloro-1-(2'-benzothiazolinone-3'-yl)ethyl]phosphorodithioate. | 100 | 20 | 50 |
| 16 | O,O-diethyl S-(2-benzothiazolinone-3-yl)methyl phosphorodithioate. | 0 | 0 | 0 |
| 17 | O,O-diethyl S-[2-chloro-1-(2'-benzothiazolinone-3'-yl)ethyl]phosphorothioate. | | 50 | 0 |

From the foregoing data it can be seen that the compounds of this invention (Test Samples 1–4, 6, 7, 9–12, 14, 15 and 17) are highly toxic to southern army worm larvae with the diethyl compounds being generally substantially more toxic to the larvae than the corresponding dimethyl compounds (compare Test Sample 3 data with Test Sample 1 data, Test Sample 4 data with Test Sample 2 data, Test Sample 14 data with Test Sample 11 data, and Test Sample 15 data with Test Sample 12 data), and the 2-benzoxazolinone derivatives being generally substantially more toxic than the corresponding 2-benzothiazolinone derivatives (compare Test Sample 2 data with Test Sample 11 data, Test Sample 3 data with Test Sample 15 data, Test Sample 4 data with Test Sample 14 data, and Test Sample 9 data with Test Sample 17 data). Moreover, it can be observed that the compounds of this invention generally are substantially more toxic to southern army worm larvae than the comparable compounds (Test Samples 5, 8, 13 and 16) of the prior art (compare the data of Test Samples 3 and 4 with the data of Test Sample 5, the data of Test Samples 6 and 7 with the data of Test Sample 8, the data of Test Samples 11 and 12 with the data of Test Sample 13, and the data of Test Samples 14 and 15 with the data of Test Sample 16).

Hence, this invention provides new and useful compounds and compositions.

Other advantages, features and specific embodiments of this invention will become readily apparent to those exercising ordinary skill in the art after reading the foregoing disclosures. These specific embodiments are within the scope of the claimed subject matter unless expressly excluded by claim language. Also, while specific embodiments of this invention have been described in considerable detail, variations and modifications of them can be effected without departing from the spirit and scope of the invention as disclosed and claimed.

The term "consisting essentially of" as used in this specification excludes any unrecited substance at a concentration sufficient to substantially adversely affect the essential properties and characteristics of the recited substances, while permitting the presence of one or more unrecited substances at concentrations insufficient to substantially adversely affect said essential properties and characteristics.

What I claim and desire to protect by Letters Patent is:

1. A composition for killing southern army worm larvae, comprising an effective quantity for killing southern army worm larvae of a compound of the formula:

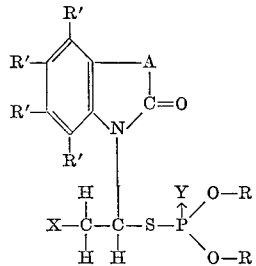

wherein each R is lower alkyl, Y is selected from the group consisting of oxo and thioxo, X is halo, A is selected from the group consisting of oxy and thio, and each R' is selected from the group consisting of hydrogen and halo, and a dispersible carrier therefor.

2. A composition according to claim 1, wherein said carrier is a divided inert solid.

3. A composition according to claim 2, which comprises emulsifying material.

4. A composition according to claim 1, wherein said carrier comprises an inert, volatile, water-immiscible solvent for said compound.

5. A composition according to claim 4, which comprises emulsifying material.

6. A composition according to claim 5, wherein said carrier comprises water, said compound is dissolved in said solvent, and said solvent is dispersed in said water.

7. A method for killing southern army worm larvae, which comprises applying to said larvae an effective quantity for killing southern army worm larvae of a compound of the formula:

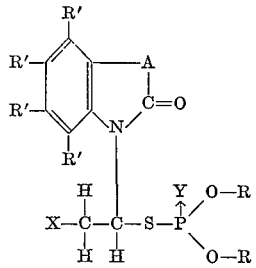

wherein each R is lower alkyl, Y is selected from the group consisting of oxo and thioxo, X is halo, A is selected from the group consisting of oxy and thio, and each R' is selected from the group consisting of hydrogen and halo.

References Cited

UNITED STATES PATENTS

| | | | |
|---|---|---|---|
| 2,984,669 | 5/1961 | Brahler et al. | 260—307 |
| 3,256,293 | 6/1966 | Baker et al. | 260—307 |
| 3,355,353 | 11/1967 | Jamison | 424—200 |
| 2,877,155 | 3/1959 | Metivier | 424—200 |

FOREIGN PATENTS 869,399  5/1961  Great Britain.

OTHER REFERENCES

Merck Index, 1960, 7th edition, Merck and Co., Inc., Rahway, N.J., p. 1055.

ALBERT T. MEYERS, Primary Examiner

J. D. GOLDBERG, Assistant Examiner